(12) United States Patent
Kono et al.

(10) Patent No.: US 11,405,550 B2
(45) Date of Patent: Aug. 2, 2022

(54) IMAGING DEVICE WITH BATTERY PRIORITIZATION

(71) Applicant: Panasonic Intellectual Property Management Co., Ltd., Osaka (JP)

(72) Inventors: Tomonori Kono, Osaka (JP); Kin Nishikawa, Osaka (JP); Shingo Hashimoto, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 205 days.

(21) Appl. No.: 16/770,976

(22) PCT Filed: Aug. 26, 2019

(86) PCT No.: PCT/JP2019/033268
§ 371 (c)(1),
(2) Date: Jun. 9, 2020

(87) PCT Pub. No.: WO2020/121603
PCT Pub. Date: Jun. 18, 2020

(65) Prior Publication Data
US 2021/0227136 A1    Jul. 22, 2021

(30) Foreign Application Priority Data
Dec. 12, 2018  (JP) .............................. JP2018-232430

(51) Int. Cl.
*H04N 5/232*  (2006.01)
*H02J 7/00*  (2006.01)
(Continued)

(52) U.S. Cl.
CPC ......... *H04N 5/23241* (2013.01); *G03B 17/56* (2013.01); *H02J 7/0049* (2020.01);
(Continued)

(58) Field of Classification Search
CPC .......... H04N 5/3698; H04N 5/232411; H04N 5/23241; H04N 1/00885; G03B 2217/007; G03B 7/26
See application file for complete search history.

(56) References Cited

U.S. PATENT DOCUMENTS

| 5,926,661 A | * | 7/1999 | Maeno ..................... G03B 7/26 |
| | | | 396/303 |
| 2001/0005124 A1 | * | 6/2001 | Odeohhara ............. G06F 1/263 |
| | | | 320/116 |

(Continued)

FOREIGN PATENT DOCUMENTS

JP     H11-295808 A    10/1999
JP     2001-313858 A   11/2001
(Continued)

OTHER PUBLICATIONS

International Search Report and Written Opinion for corresponding International Application No. PCT/JP2019/033268, dated Nov. 19, 2019.

*Primary Examiner* — Twyler L Haskins
*Assistant Examiner* — Dwight C Tejano
(74) *Attorney, Agent, or Firm* — Renner, Otto, Boisselle & Sklar, LLP (57) ABSTRACT

The imaging device 102, to which an extension device 103 for accommodating an external battery 202 can be detachably attached, comprises a main body 102a for accommodating an internal battery 201, a charge IC 231, an operation unit 160, and a charge microcomputer 232. The charge IC 231 charges the internal battery 201 or the external battery 202 with power input from outside. The operation unit 160 receives an input for setting a use order of the internal battery 201 and the external battery 202. The charge micro-
(Continued)

computer 232 controls the charge IC 231 so as to charge the internal battery 201 or the external battery 202 according to the priority order.

4 Claims, 8 Drawing Sheets

(51) Int. Cl.
 *G03B 17/56* (2021.01)
 *H04N 5/225* (2006.01)
(52) U.S. Cl.
 CPC ........ *H02J 7/0071* (2020.01); *H02J 7/00712* (2020.01); *H04N 5/2252* (2013.01); *G03B 2217/007* (2013.01); *H02J 2310/22* (2020.01)

(56) References Cited

U.S. PATENT DOCUMENTS

2008/0315840 A1* 12/2008 Mori ................. H04N 5/23241
 320/136
2009/0284225 A1* 11/2009 Nakanuma .......... H01M 50/569
 320/134
2011/0009172 A1* 1/2011 Song ................. H04M 1/72427
 455/566
2013/0113417 A1* 5/2013 Nakashima ............... H02J 7/04
 320/162
2013/0272691 A1* 10/2013 Yamaguchi ............... G05F 3/08
 396/301
2019/0020819 A1* 1/2019 Hashimoto ........... H02J 7/0047
2019/0181509 A1* 6/2019 Ohtsuka ............... H04N 5/2251
2019/0280516 A1* 9/2019 Shimaya ............... G03B 17/14

FOREIGN PATENT DOCUMENTS

| JP | 2002-010508 A | 1/2002 |
| JP | 2002-351350 A | 12/2002 |
| JP | 2003-085954 A | 3/2003 |
| JP | 2012-039358 A | 2/2012 |
| JP | 2013-219952 A | 10/2013 |

* cited by examiner

IMAGING DEVICE WITH BATTERY PRIORITIZATION

TECHNICAL FIELD

The present disclosure relates to an imaging device. More particularly, it relates to an imaging device to which an extension device for accommodating an external battery can be connected.

BACKGROUND ART

An imaging device, such as a digital camera, can be powered by not only an internal battery that is removably mounted inside a main body but also an external battery mounted in an extension device (e.g. battery grip) that is removably mounted to the outside of the main body. For charging an internal battery and an external battery, a method is known in which either one of the internal battery or the external battery is selected according to a remaining battery level and charged (see Patent Literatures 1 and 2).

SUMMARY OF INVENTION

Technical Problem

Even with the same imaging device, power consumption of the external battery or the internal battery differs depending on how a user uses the imaging device system. Therefore, there is a need to preferentially charge either the external battery or the internal battery.

The present disclosure provides an imaging device that can charge a battery in accordance with how the device is used by a user.

Solution To Problem

The imaging device according to the present disclosure is an imaging device to which an extension device for accommodating an external battery can be detachably attached, the imaging device comprising a main body, a charging unit, an operation unit, and a controller. The main body is configured to accommodate an internal battery. The charging unit is configured to charge the internal battery or the external battery with power input from outside. The operation unit is configured to receive an input for setting a priority order for charging the internal battery and the external battery. The controller is configured to control the charging unit to charge the internal battery or the external battery according to the priority order.

Effects of Invention

According to the imaging device of the present disclosure, it is possible to charge a battery in accordance with how the imaging device is used by a user.

DESCRIPTION OF EMBODIMENTS

Hereinafter, an embodiment will be described in detail, with reference to the drawings when appropriate. Any explanations deemed unnecessary may be omitted. For example, detailed description of well-known aspects or duplicate description of substantially identical components may be omitted. This is to avoid unnecessary redundant description in the following and to facilitate understanding by those skilled in the art.

The inventors provide the accompanying drawings and the following description so that those skilled in the art can fully understand the present disclosure, and these are not intended to limit the subject matter recited in the claims.

1. Embodiment 1

Figure 1:
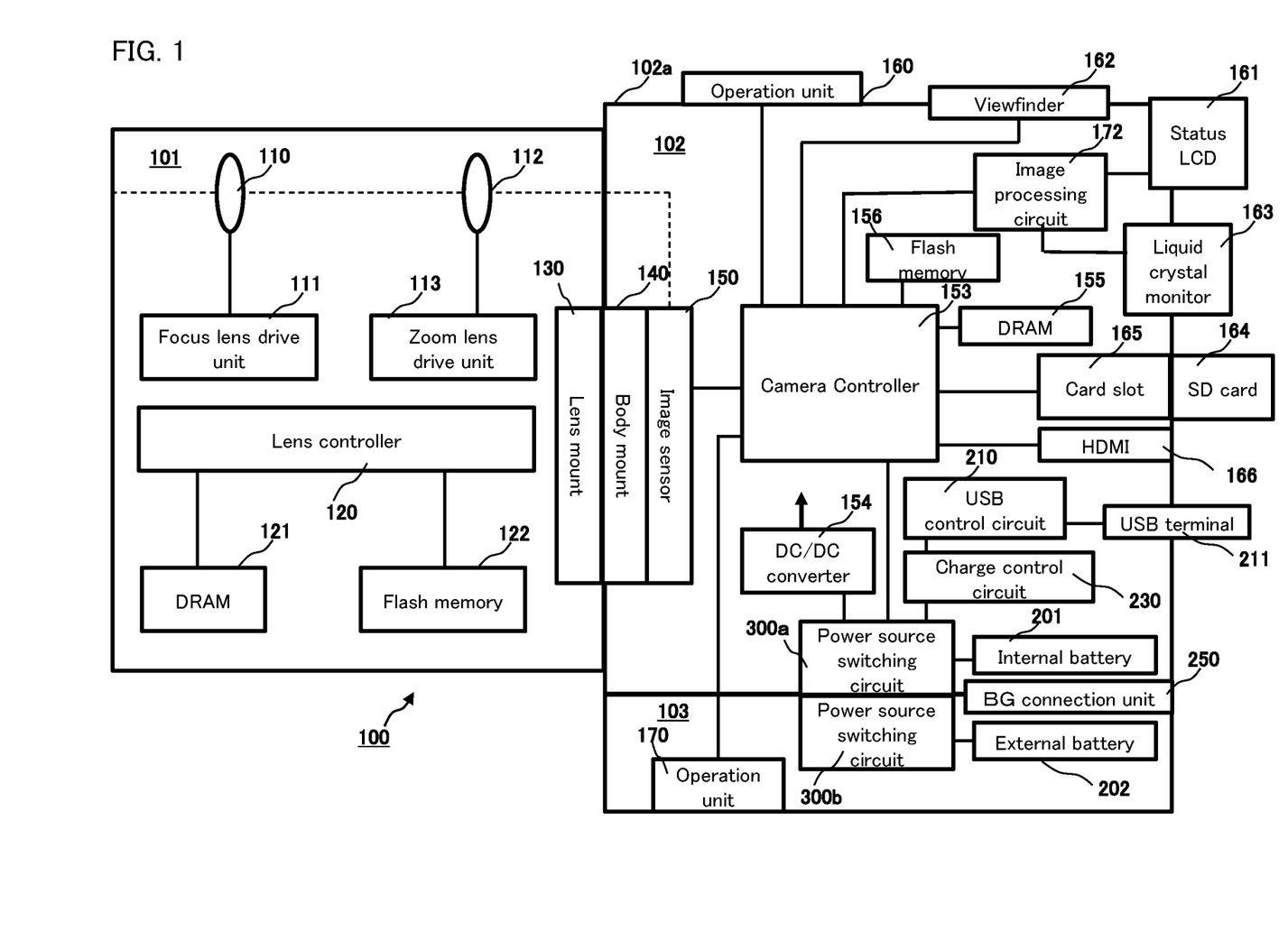
FIG. 1 is a configuration diagram of a digital camera according to Embodiment 1.

In the present embodiment, control of a camera system 100 including a digital camera 102 (an example of an imaging device) will be described. The digital camera 102 is used with a battery grip (BG; an example of an extension device) to which an external battery as a spare battery is mounted, in order to actuate the digital camera over a longer time. The battery grip is attached to a main body 102*a* to which an internal battery is mounted 1-1. Configuration 1-1-1. Overall Configuration FIG. 1 shows an overall configuration of the camera system 100 according to the present embodiment. The camera system 100 includes a digital camera 102, an interchangeable lens 101 detachably attached to the digital camera 102, and a battery grip 103 that can be detachably attached to the digital camera 102.

1-1-2. Configuration of Interchangeable Lens 101

The interchangeable lens 101 is detachably attached to the digital camera 102. When the interchangeable lens 101 is mounted, the lens mount 130 is mechanically and electrically connected to the main body mount 140 of the digital camera 102.

The interchangeable lens 101 receives light and forms a subject image on the image sensor 150 of the digital camera 102. The interchangeable lens 101 comprises a focus lens 110, a focus lens driving unit 111, a zoom lens 112, a zoom lens driving unit 113, a lens controller 120, a DRAM 121, a flash memory 122, and the lens mount 130.

The focus lens 110 includes an arbitrary number of lenses or an arbitrary number of lens groups for changing a focus state of the subject image. The focus lens driving unit 111 moves the focus lens 110 forward and backward along the optical axis according to a command from the lens controller 120.

The zoom lens 112 includes an arbitrary number of lenses or an arbitrary number of lens groups for changing a magnification of the subject image. The zoom lens driving unit 113 moves the zoom lens 112 along the optical axis according to a command from the lens controller 120.

The lens controller 120 is a processor such as a CPU that controls an entire operation of the interchangeable lens 101. The DRAM 121 is used as a work memory by the lens controller 120. The flash memory 122 stores programs, parameters, and lens data used by the lens controller 120. The lens data includes characteristic values unique to the interchangeable lens 101, such as a lens name, a lens ID, a serial number, an F number, and a focal length. The lens controller 120 inform the digital camera 102 of the lens data, and the digital camera 102 performs various controls according to the lens data. The lens controller 120 transmits a command to the focus lens driving unit 111 and/or the zoom lens driving unit 113 according to a user's operation of the lenses to drive the lenses.

1-1-3. Configuration of Digital Camera 102

As shown in FIG. 1, the digital camera 102 includes an operation unit 160 disposed on the main body 102a and a battery grip (BG) connection unit 250.

The operation unit 160 is an operation unit for operating the digital camera 102, and includes a release button, other buttons, a cross key, a dial, a touch panel disposed on a liquid crystal monitor 163 as will be described later, and the like. The BG connection unit 250 includes a mechanism for physically fixing the battery grip 103 to the main body 102a, and may include, for example, a screw and a screw hole.

The digital camera 102 further includes a main body mount 140, an image sensor 150, a camera controller 153, a DRAM 155, a flash memory 156, a status LCD 161, a viewfinder 162, a liquid crystal monitor 163, an SD card 164, a card slot 165, and an HDMI™ interface 166, and an image processing circuit 172.

The main body mount 140 transmits and receives data between the main body 102a and the interchangeable lens 101 via the lens mount 130. The main body mount 140 transmits a signal received from the camera controller 153 to the lens controller 120 via the lens mount 130. Further, the main body mount 140 transmits a signal received from the lens controller 120 to the camera controller 153 via the lens mount 130.

The camera controller 153 includes a processor such as a CPU. The camera controller 153 controls an entire operation of the camera system 100, including an image processing and other controlled actions, according to instructions from the operation unit 160. The camera controller 153 may be configured by a hard-wired electronic circuit, or may be configured by a microcomputer that executes a program. The camera controller 153 may be configured as an integrated circuit that is integral with or separate from the image processing circuit 172 and the DRAM 155.

The DRAM 155 is used as a work memory by the camera controller 153. The flash memory 156 stores image data and also stores programs and parameters used by the camera controller 153.

The image sensor 150 is a CMOS image sensor, and includes a light receiving element, an automatic gain control circuit, and an analog/digital converter. The light receiving element converts an optical signal collected by the interchangeable lens 101 into an electric signal and outputs the electric signal. The automatic gain control circuit amplifies the electric signal output from the light receiving element and output the amplified electric signal. The analog/digital converter converts the electric signal output from the automatic gain control circuit into a digital signal and outputs the digital signal. The image sensor 150 operates in synchronization with a predetermined timing signal under control of the camera controller 153, and performs imaging of a still image and a video, imaging of a through image, a data transfer, an operation of an electronic shutter, and the like. Image data produced by the image sensor 150 are sent to the image processing circuit 172.

The image sensor 150 may be another image sensor such as an NMOS image sensor or a CCD image sensor in place of the CMOS image sensor.

The liquid crystal monitor 163 is a liquid crystal display (Liquid Crystal Display (LCD)) disposed on a back of the digital camera 102. The liquid crystal monitor 163 displays image data (a still image or a video) that have been processed by the image processing circuit 172. The liquid crystal monitor 163 displays a setting menu for setting operation conditions for the camera system 100. In particular, the liquid crystal monitor 163 displays a menu screen for setting a use order of batteries (the internal battery 201 or the external battery 202) used by a user, as will be described later. The liquid crystal monitor 163 includes a touch panel that functions as a component of the operation unit 160.

In place of the liquid crystal monitor 163, another display device such as an organic EL (Electroluminescence) display may be used.

The viewfinder 162 is an electronic viewfinder, on which a screen such as a liquid crystal display or an organic EL display is disposed. The screen is supplied with image data from the image sensor 150 and displays the image data as a real-time image (through image). The viewfinder 162 may be an optical viewfinder.

The status LCD 161 is an organic EL display disposed on the main body 102a (for example, an upper surface of the main body) separately from the liquid crystal monitor 163. The status LCD 161 may use a liquid crystal display. The status LCD 161 displays information according to a command from the camera controller 153. The information displayed on the status LCD 161 is, for example, information indicating remaining battery levels of the internal battery 201 and the external battery 202, as will be described later.

The card slot 165 electrically and mechanically connects the SD card 164, which is a removable external storage medium, to the main body 102a. The SD card 164 is configured to be detachable from the card slot 165 and includes inside a storage element such as a flash memory. The camera controller 153 stores captured image data in the SD card 164. The digital camera 102 may include a plurality of card slots for shooting a video for a long time.

The camera controller 153 reads the image data stored in the SD card 164, processes the read image data with the image processing circuit 172, and displays the processed image data on the liquid crystal monitor 163.

The HDMI (registered trademark) interface 166 outputs the captured image data to an external storage device, for example, a hard disk recorder.

The image processing circuit 172 carries out predetermined image processing on the image data output from the image sensor 150. The predetermined image processing includes gamma correction processing, white balance correction processing, flaw correction processing, YC conversion processing, digital zoom processing, shrink processing, stretch processing, and the like.

The digital camera 102 further includes a USB terminal 211, a USB control circuit 210, a charge control circuit 230, a power source switching circuit 300 (300a), an internal battery 201, and a DC/DC converter 154. These components mainly carries out charge control and power source switching according to the present embodiment, which will be described later.

The USB terminal 211 is a type C terminal, and is a connection terminal for connecting an external connected device (not shown) to the digital camera 102 via a USB cable (not shown). The USB terminal 211 includes a VBUS terminal and a GND terminal for a power source, a CC (Configuration Channel) terminal 211b (FIG. 2) described later, and a terminal for D+ and D− signals. The connected device is a device such as a PC, and has similar terminals when the device is a USB PD compliant device. The connected device pulls up a CC and monitors voltage of the CC terminal. The connected device supplies voltage to the VBUS (FIG. 2) upon detecting a pulling down of the CC on the digital camera 102 side. As a result, power is supplied to the digital camera 102 side.

The USB control circuit 210 includes a PD controller 212 shown in FIG. 2, and negotiates with a connected device via the CC terminal 211b of the USB terminal 211 as will be described later.

Figure 2:
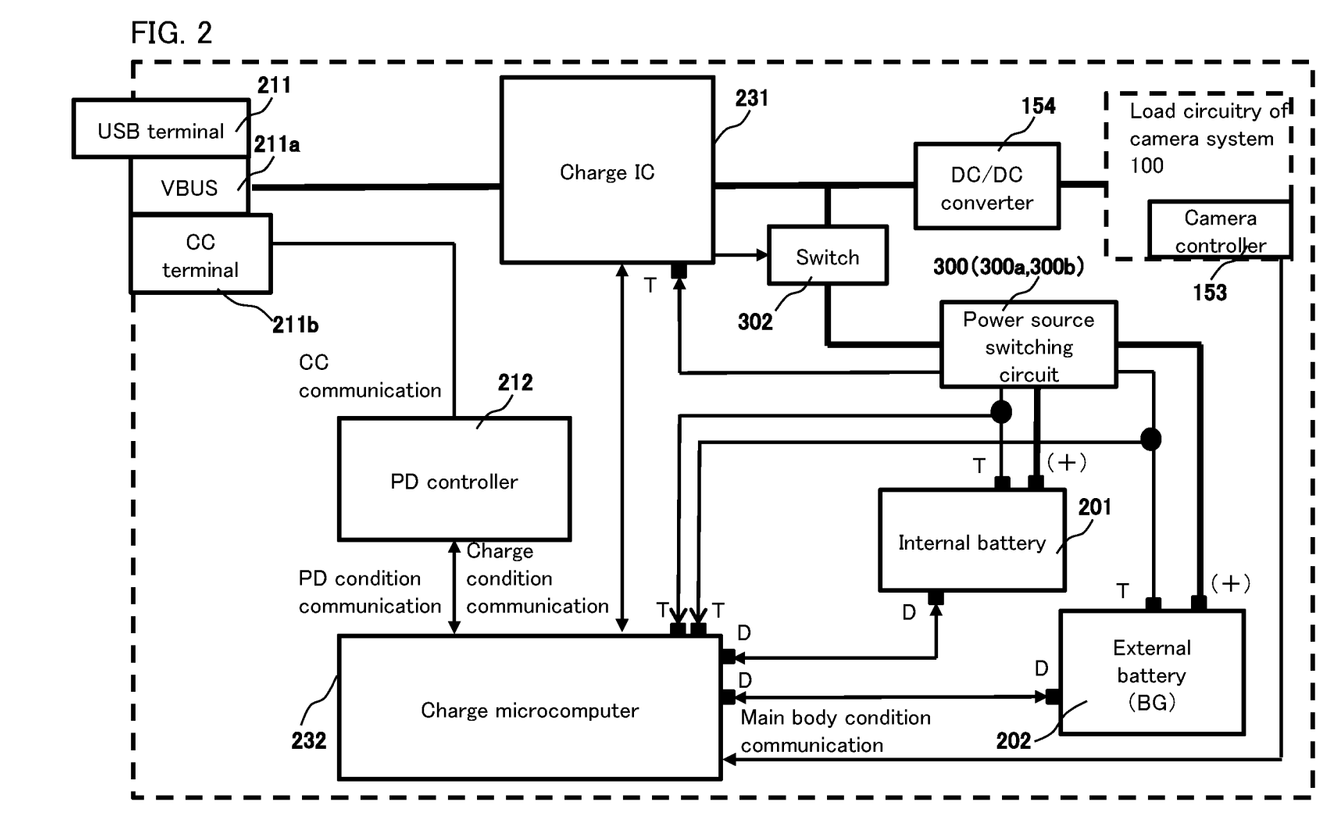
FIG. 2 is a circuit block diagram for controlling charging of the digital camera.

The charge control circuit 230 includes a charge IC (integrated circuit) 231 (an example of a charging unit) and a charge microcomputer 232 (an example of a controller) shown in FIG. 2, and controls charging of the internal battery 201 and the external battery 202. The charge IC 231 supplies voltage obtained from a connected device that is a USB PD compliant device via the VBUS 211a of the USB terminal 211 to loads of the camera system 100 which include components of the main body 102a and components of the interchangeable lens 101 via the DC/DC converter 154. The charge microcomputer 232 communicates with the PD controller 212 and the charge IC 231.

When the battery grip 103 is attached to the digital camera 102, the power source switching circuit 300a and a power source switching circuit 300b of the battery grip 103 described later configure a power source switching circuit 300 of the digital camera 102. The power source switching circuit 300 is controlled by the charge control circuit 230 to switch the power used by the digital camera 102 to the internal battery 201 or the external battery 202 of the digital camera 102. This switching is performed in accordance with a battery use order set by a user as will be described later.

The DC/DC converter 154 receives power from the power source switching circuit 300 described later, which is power from the internal battery 201 or the external battery 202, and supplies the power to the components of the digital camera 102 and the interchangeable lens 101 that are actuated by the supplied power. Load circuitry in the digital camera 102 include components such as the image sensor 150, the camera controller 153, the DRAM 155, the flash memory 156, the liquid crystal monitor 163, the card slot 165, the HDMI™ interface 166, the image processing circuit 172, and the interchangeable lens 101 of the digital camera 102, and the like. In order to supply power to the components, the DC/DC converter 154 converts voltage supplied from the batteries 201 and 202 into voltage suitable for the load circuitry for the components.

The internal battery 201 is, for example, a lithium ion battery, housed in the main body 102a, and supplies power for actuating the digital camera 102 and the interchangeable lens 101. The internal battery may be another type of a secondary battery. Further, the internal battery 201 may be removably mounted in the digital camera 102, or may be of a type that is not removable. The internal battery 201 includes a power amount measuring unit such as a battery monitoring IC, which measures a remaining battery level and informs the charge microcomputer 232 of the remaining battery level.

The power source of the digital camera 102 is turned ON/OFF by a power switch (not shown) disposed on the main body 102a. When the power source is turned ON, the camera controller 153 supplies power to the components of the main body 102a of the digital camera 102 as described above. The camera controller 153 also supplies power to the interchangeable lens 101 via the main body mount 140 and the lens mount 130.

1-1-4. Configuration of Battery Grip 103

The battery grip 103 includes an operation unit 170, an external battery 202, and a power source switching circuit 300b.

The operation unit 170 includes a release button, other buttons, a cross key, a dial, and the like.

The external battery 202 is housed in the battery grip 103 and supplies power for actuating the digital camera 102 similarly to the internal battery 201. The external battery 202 may be a primary battery or a secondary battery. The external battery 202 may be the same type as the internal battery 201 or may be a different type.

When the battery grip 103 is attached to the digital camera 102, the power source switching circuit 300b and the power source switching circuit 300a of the digital camera 102 configure the power source switching circuit 300 for the digital camera 102, as described above.

In this embodiment, when the battery grip 103 is attached to the digital camera 102, the power source switching circuit 300a in the main body 102a and the power source switching circuit 300b in the battery grip 103 configure the power source switching circuit 300. However, the power source switching circuit 300 may not be provided on both of the digital camera 102 and the battery grip 103 but instead provided only on either one.

1-2. Actions 1-2-1. Charge Control Circuit

With reference to FIG. 2, an action of a circuit for performing charging control for the digital camera 102 in the present embodiment will be described. The circuit shown in FIG. 2 includes the above-described USB terminal 211, the PD controller 212, the charge IC 231, the charge microcomputer 232, the power source switching circuit 300, the switch 302, the internal battery 201, and the external battery 202.

When a connected device that is a USB PD compliant device is connected to the USB terminal 211, the PD controller 212 performs negotiation with the connected device via the CC terminal 211b. In the negotiations, conditions such as a direction of power supply between the digital camera 102 and the connected device, a setting of current/voltage, roles of terminals, etc., are decided via the CC terminal 211b. The charge microcomputer 232 communicates with the PD controller 212, acquires the result, determines whether or not the connected device is a USB PD compliant device, and sets the conditions (for example, 9 V or 5 V as a set voltage). The charge microcomputer 232 also determines charging conditions for the internal battery 201 and the external battery 202 in accordance with communication with the charge IC 231.

When the connected device as a USB PD compliant device is connected to the USB terminal 211, power is supplied from the connected device via the charge IC 231. The charge microcomputer 232 acquires setting information from the camera controller 153 such as information on whether the internal battery 201 or the external battery 202 has a charging priority, information on whether the power source is ON or OFF, temperature information of the camera body 102a. In accordance with the information, the charge microcomputer 232 controls the charge IC 231 to permit power supply to the load circuitry of the camera system 100 and turn the switch 302 ON or OFF via the charge IC 231. The charge microcomputer 232 performs charging of the internal battery 201 and the external battery 202 by causing the charge IC 231 to control the ON action of the switch 302 and the switching of the power source switching circuit 300. The charge IC 231 controls the switch 302 to carry out charging of a selected battery, or carry out power supply to the digital camera 102 from the selected battery.

The charge microcomputer 232 also detects a temperature of the battery from T terminals of the internal battery 201 and the external battery 202. When the temperature of the battery becomes equal to or higher than a predetermined value, the charge microcomputer 232 stops charging the battery if the battery is being charged in order to prevent the battery from deteriorating.

Figure 3:
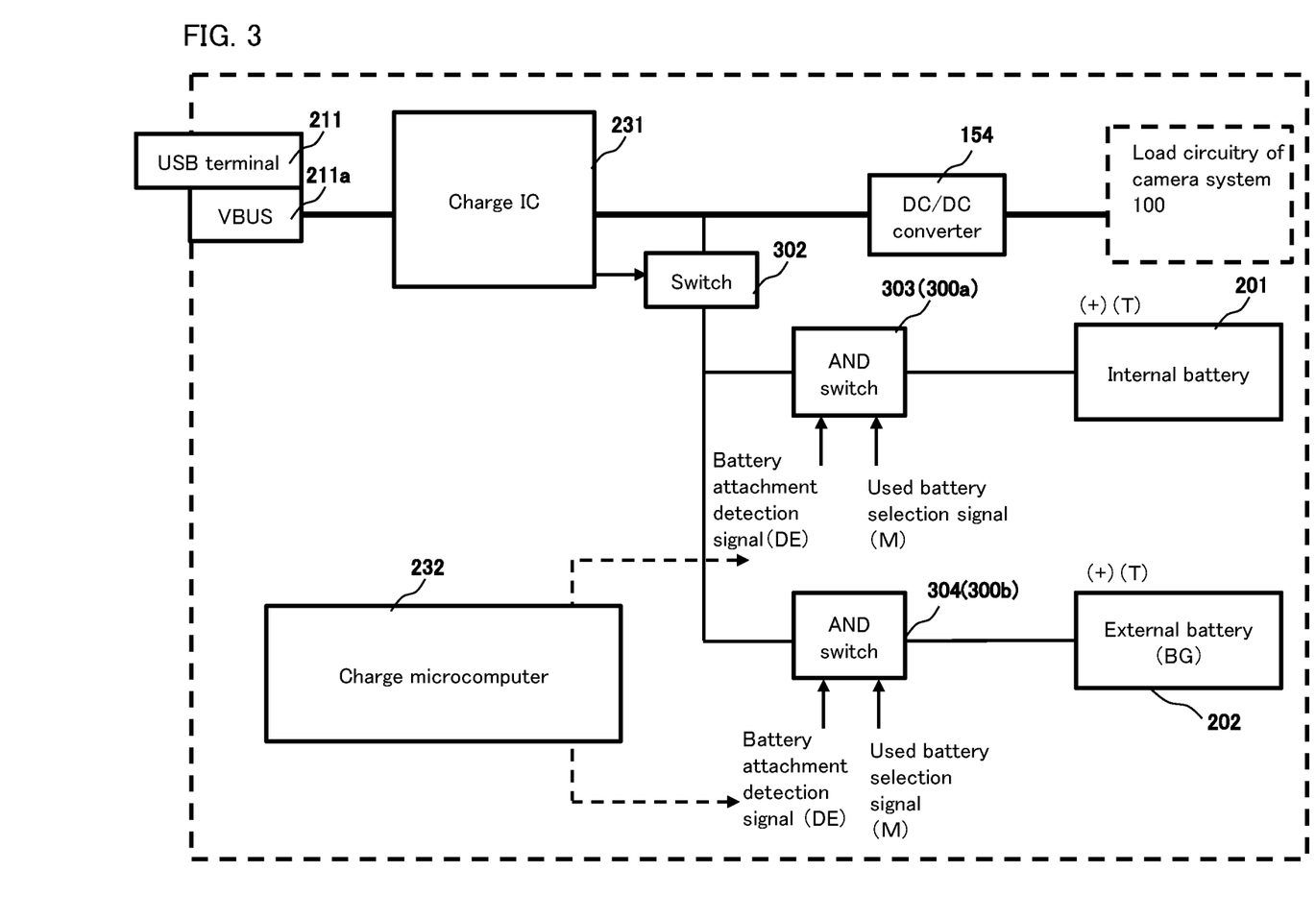
FIG. 3 is a circuit block diagram for selecting a battery for the digital camera.
Figure 4:
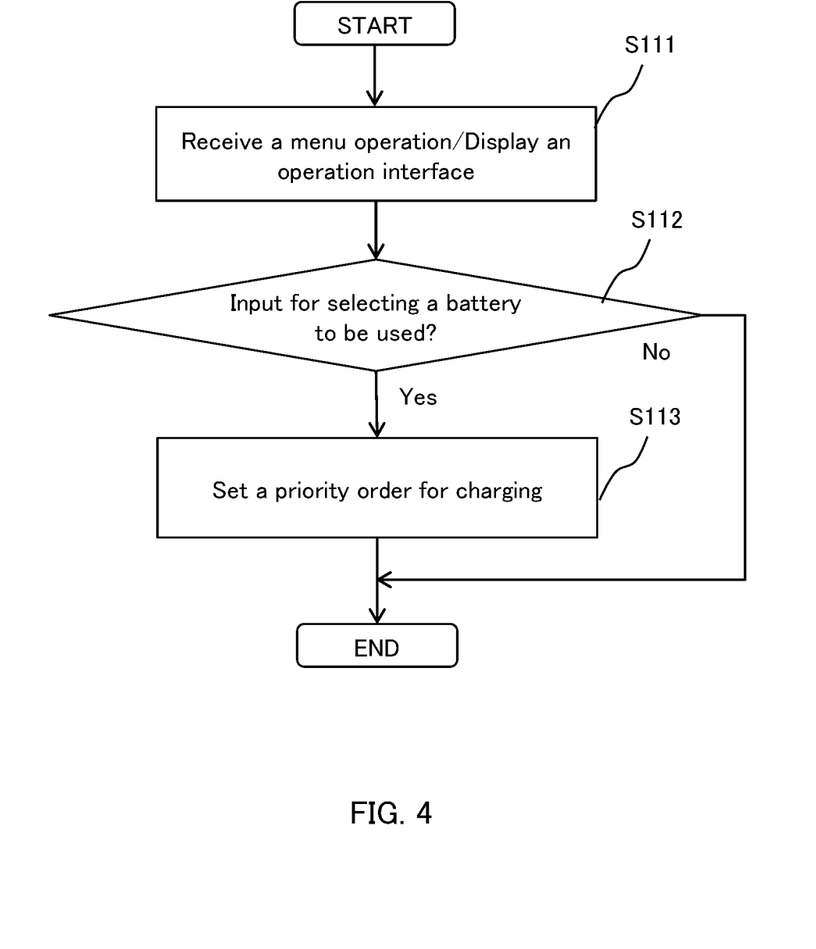
FIG. 4 is a flowchart illustrating an action for setting a priority order for charging.

The action of the power source switching circuit 300 for selecting the battery will be described with reference to FIG. 3. The circuit shown in FIG. 3 includes the USB terminal 211, the charge IC 231, the charge microcomputer 232, the switch 302, the internal battery 201, and the external battery 202, as described above.

The charge microcomputer 232 determines attachment of the internal battery 201 and the external battery 202 according to the presence or absence of a signal from the +terminal (battery voltage) and/or the T terminal of each of the internal battery 201 and the external battery 202.

The charge microcomputer 232 controls a signal for selecting a battery to be used (the internal battery or the external battery) according to the setting of a battery use order, which will be described later. Specifically, the charge microcomputer 232 controls an AND switch 303 connected to the internal battery 201 and an AND switch 304 connected to the external battery 202. The AND switch 303 is turned ON when both a battery attachment detection signal (DE) and a used battery selection signal (M) are input. As a result, the internal battery 201 is charged, and power can be supplied from the internal battery 201 to the digital camera 102. Similarly, the AND switch 304 is turned ON when both a battery attachment detection signal (DE) and a used battery selection signal (M) are input. As a result, the external battery 202 is charged, and power can be supplied from the external battery 202 to the digital camera 102. This charging and supplying of power is carried out by the charge IC 231 switching the switch 302.

1-2-2. Setting/Changing of Charging Priority

The used battery selection signal (M) is generated according to a user's selection and setting of a battery to be used on a menu screen displayed on the liquid crystal monitor 163. In the present embodiment, as a result of this selection and setting, a priority order for charging from the connected device is set. Hereinafter, the operation for setting the charging priority order will be described with reference to FIGS. 4 to 7.

Figure 5:
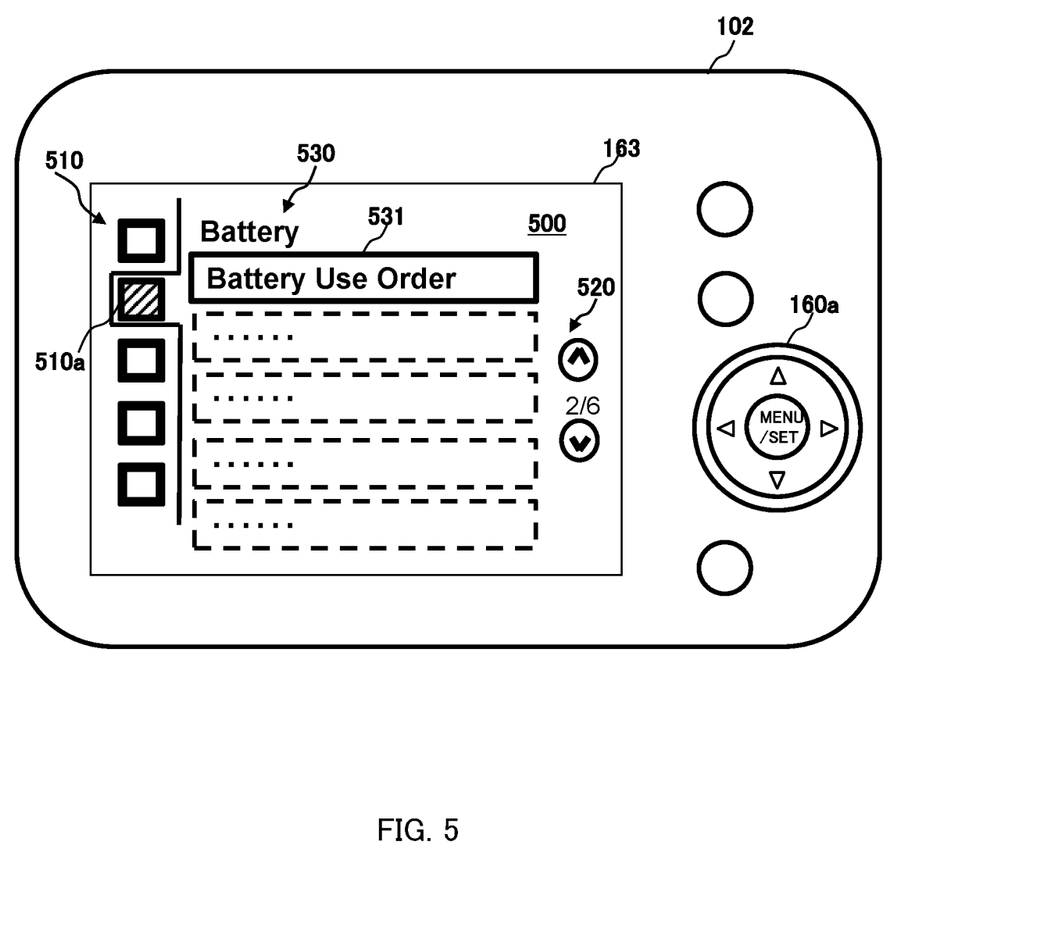
FIG. 5 shows a menu screen for setting a battery use order.

Upon operation of the operation unit 160 by a user, the camera controller 153 controls the image processing circuit 172 to display a menu screen on the liquid crystal monitor 163. On the menu screen, for example, an operation interface for inputting a battery use order as shown in FIG. 5 is displayed on the screen 500 (S111).

The screen 500 includes an icon display area 510, a menu display area 530, and a screen scrolling button display area 520. In the icon display area 510, a plurality of icons are shown. Here, an icon 510*a* indicating setting of the battery is selected. The selection by the operation interface on the screen 500 may be carried out through a touch panel provided on the liquid crystal monitor 163, or may be carried out by using the cross key 160*a* which is a part of the operation unit 160.

Figure 6:
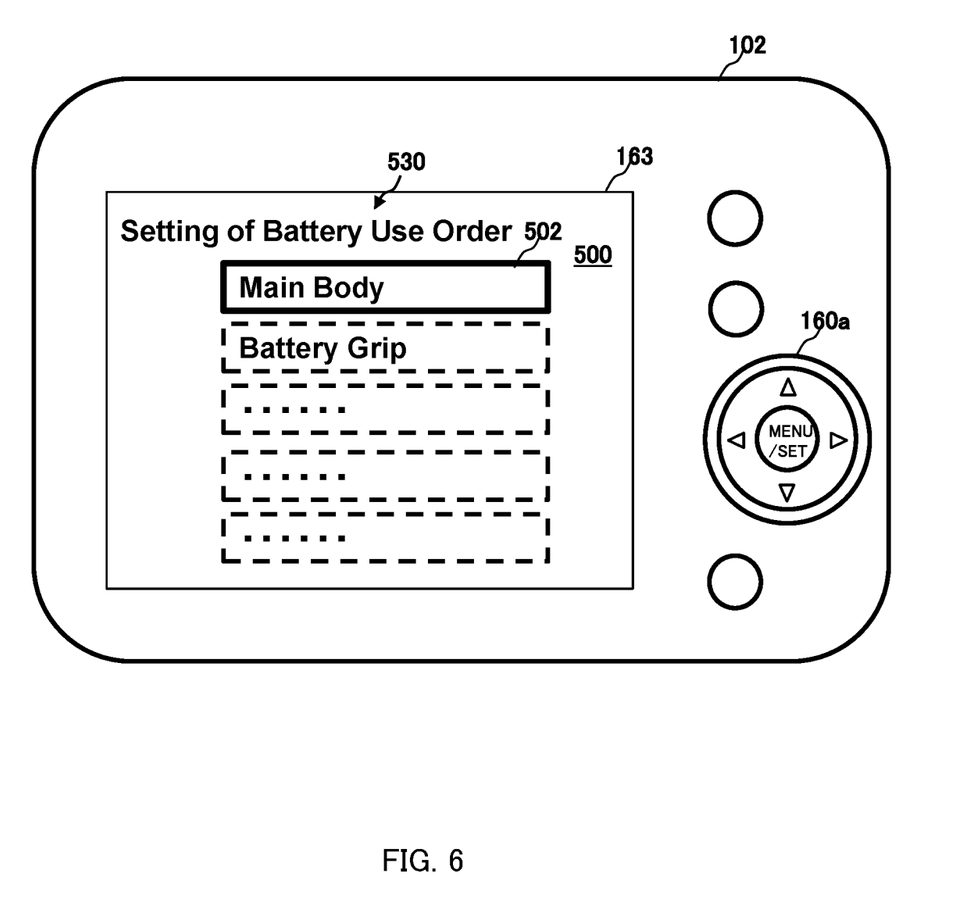
FIG. 6 shows a menu screen for setting the battery use order.

In the menu display area 530, menu bars for a battery setting are displayed, and now a battery use order setting bar 531 is selected. Upon selection of the battery use order setting bar 531, battery selection bars 502 are displayed in the menu display area 530 as shown in FIG. 6. The user selects a selection bar 502 similarly to an example shown in FIG. 5. Although it is possible to select the battery grip (external battery 202) using the cross key 160*a* for the battery use order, the main body (the internal battery 201) is selected in this example. When this selection input is detected by the camera controller 153 (Yes in S112), the set order is stored in the memory, the battery use order is set, and this order is set as the charging priority (S113). The same processes as in S111 to S113 are performed when the battery use order is changed.

Figure 7:
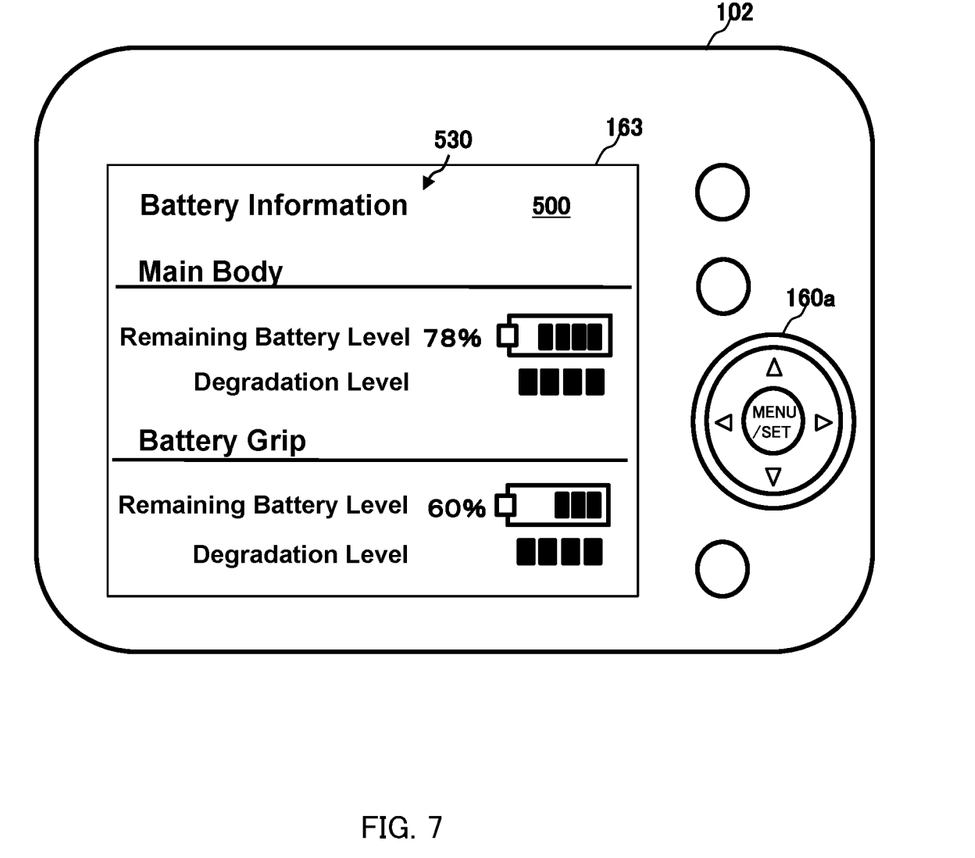
FIG. 7 shows a menu screen for setting the battery use order.

In the setting of a battery use order, battery information including a remaining battery level and/or a battery degradation level for the internal battery 201 and the external battery 202 shown in FIG. 7 may be displayed before the input screen for setting a battery use order shown in FIG. 6. is displayed. After confirming the battery information, a user can set a battery use order based on the battery information. For example, a user can set the battery use order so that a battery with a larger remaining battery level or a battery with a smaller degree of degradation is preferentially used.

1-2-3. Charging

Figure 8:
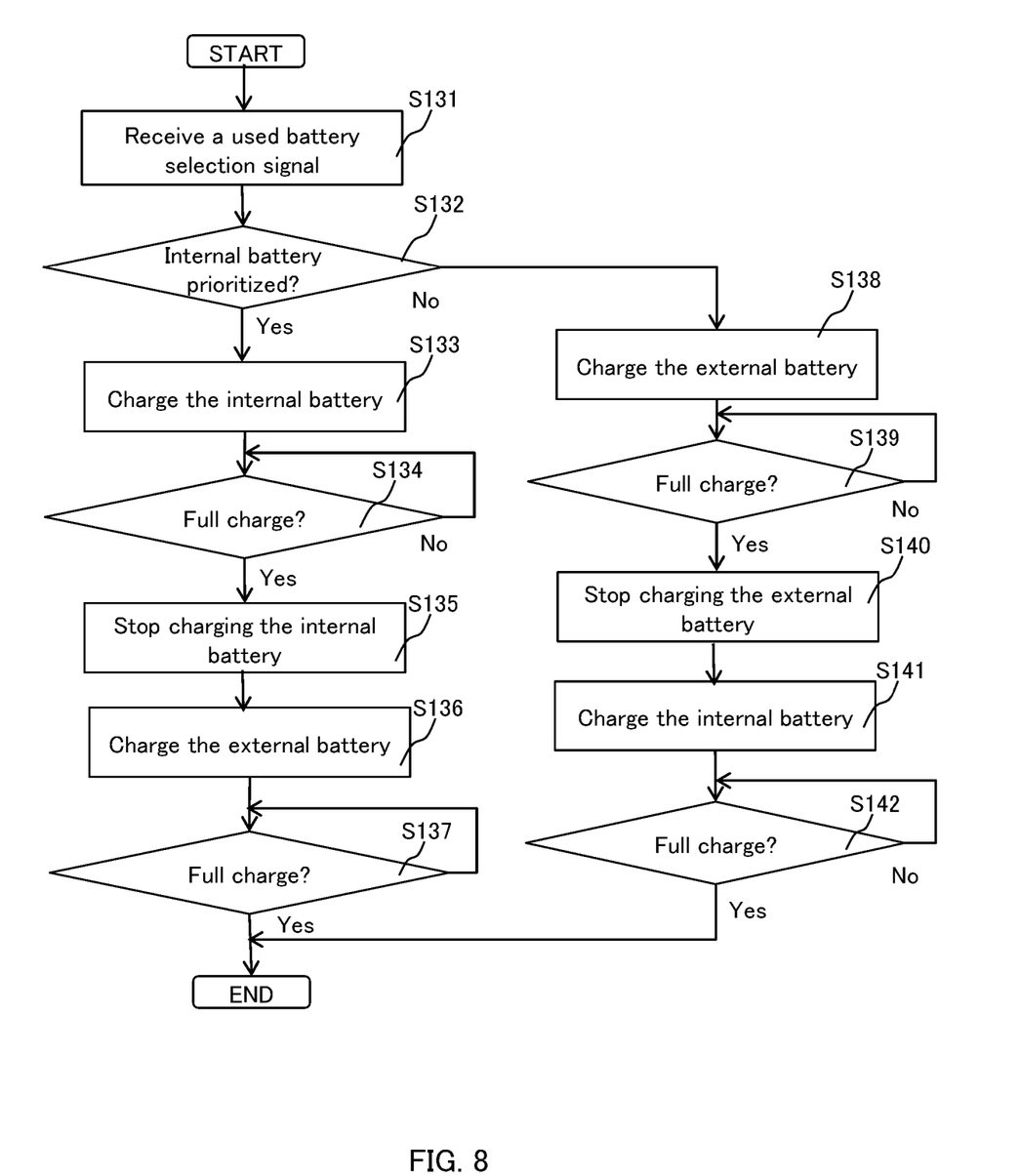
FIG. 8 is a flowchart illustrating an action of charging according to Embodiment 1.

The charging performed by the circuitry shown in FIGS. 2 and 3 will be described with reference to FIG. 8. At the start of charging, it is assumed that connection of a USB PD compliant connected device has been detected by the PD controller 212. It is also assumed that the charge microcomputer 232 detects a battery attachment detection signal (DE) as described above for the internal battery 201 and the external battery 202, and therefore, the both batteries are attached. The charge microcomputer 232 receives a used battery selection signal (M) for the internal battery 201 or the external battery 202 from the camera controller 153 (S131). When the internal battery 201 is prioritized (Yes in S132), the charging of the internal battery 201 is performed by the charge IC 231 (S133). When the internal battery 201 is fully charged (the remaining battery level is 100%) (Yes in S134), the charging of the internal battery 201 is stopped (S135), and then, the charging of the external battery 202 is carried out (S136). When the external battery 202 is fully charged (Yes in S137), the charging is stopped and the processing is ended.

On the other hand, when the external battery 202 is prioritized (No in S132), the charging of the external battery 202 is performed by the charge IC 231 (S138). When the external battery 202 is fully charged (Yes in S139), the charging of the external battery 202 is stopped (S140), and then, the charging of the internal battery 201 is carried out (S141). When the internal battery 201 is fully charged (Yes in S142), the charging is stopped and the processing is ended.

In steps S133 to S134, S136 to S137, S138 to S139, and S141 to S142 of the above processing, the charging performed may not be a full charge (100%). Charging may be stopped at less than a full charge.

In the above-described charging action, when the USB PD compliant device is disconnected during the charging of the internal battery 201 or the charging of the external battery 202 and the power supply is stopped, the processing is ended.

1-3. Effects

The digital camera 102 according to the present embodiment is detachably attached with a battery grip 103 for accommodating the external battery 202, and includes the main body 102*a*, the charge IC 231, the operation unit 160, and the charge microcomputer 232. The main body 102*a* accommodates the internal battery 201. The charge IC 231 charges the internal battery 201 or the external battery 202 with power input from outside. The operation unit 160 receives an input for setting a use order of the internal battery 201 and the external battery 202 as a priority order. The charge microcomputer 232 controls the charge IC 231 so as to charge the internal battery 201 or the external battery 202 according to the priority order.

In the digital camera 102, a user can set a use order of the internal battery 201 and the external battery 202, thereby setting a priority order for charging, which can be changed according to how the camera system 100 is used. For example, when a user intends to use the digital camera 102 without attaching the battery grip 103, the internal battery 201 can be preferentially charged to secure power for driving the digital camera 102. On the other hand, the external battery 202 can be preferentially used and charged to secure power for driving the digital camera 102 from the aspect that the battery grip 103 to which the external battery 202 is attached can be easily replaced. Further, since the battery grip 103 can be normally charged only when the battery grip 103 is attached to the digital camera 102, it may be better to charge the battery grip 103 preferentially when the battery grip 103 is attached to the digital camera 102. Therefore, with the digital camera 102 according to the present embodiment, it is possible to charge a battery according to a condition in which a user uses the imaging device system.

2. Other Embodiments

Embodiments were described above as examples of the technology disclosed in the present application. However, these embodiments are not provided by way of limitation as to the technology in the present disclosure; this technology can also be applied as appropriate to embodiments in which changes, replacements, additions, omissions, etc., have been made. The constituent elements described in the above embodiments can also be combined to yield new embodiments.

(1) In the display examples as shown in FIGS. 5 and 6, the setting menu for a battery use order is displayed, but it may be displayed as a setting menu for a priority order for charging batteries.

Further, in the display examples shown in FIGS. 5 to 7, the screen (FIG. 7) showing the battery remaining levels of the internal battery 201 and the external battery 202 is displayed by way of switching from and to the screen (FIG. 5 or FIG. 6) for receiving an input for setting a priority order. Alternatively, both the screens may be displayed simultaneously, or displayed in a single screen.

(2) In the above embodiments, the digital camera is used as an example of the imaging device. However, the imaging device may be a device having an imaging function, such as a smartphone or another portable terminal.

(3) The sequence by which the process method in the above embodiments is carried out is not necessarily limited to what is described in the above embodiments; the sequence may be replaced or a plurality of processes may be carried out simultaneously within a range that does not deviate from the scope of the invention.

(4) A computer program executed by the camera controller 153 or the charge microcomputer 232 of the digital camera 102 and a computer-readable recording medium for recording the program in the above embodiments are included in the scope of the present invention. Examples of the computer-readable recording medium can include a flexible disk, a hard disk, a CD-ROM, an MO, a DVD, a DVD-ROM, a DVD-RAM, a BD (Blu-ray™ Disc), and a semiconductor memory.

The computer program described above is not limited to being recorded on the recording medium described above; the computer program may be acquired via an electric communication circuit, a wireless or wired communication circuit, networks typified by the Internet, etc.

As above, embodiments were described as examples of the technology in the present disclosure. The accompanying drawings and the detailed description were submitted for this purpose. Therefore, the constituent elements presented in the accompanying drawings and the detailed description may include not only the constituent elements essential to solving the problems, but also, constituent elements that are not essential to solving the problems, in order to exemplify the technology described above. Therefore, with these inessential constituent elements being presented in the accompanying drawings and detailed description, there is no need to immediately accredit these inessential constituent elements as being essential.

The embodiments described above are intended to exemplify the technology in the present disclosure, and various changes, replacements, additions, omissions, etc., can be made within a range of the claims or a range equivalent to the claims.

INDUSTRIAL APPLICABILITY

The present disclosure is applicable to an electronic device having an imaging function, such as a digital camera and a camera-equipped mobile phone.

REFERENCE NUMERALS

100: Camera system, 101: Interchangeable lens, 102: Digital camera, 102a: Main body, 103: Battery grip, 110: Focus lens, 111: Focus lens drive unit, 112: Zoom lens, 113: Zoom lens drive unit, 120: Lens controller, 121/155: DRAM, 122/156: Flash memory, 130: Lens mount, 140: Body mount, 150: Image sensor, 153: Camera controller, 154: DC/DC converter, 160: Operation unit, 160a: Cross key, 161: Status LCD, 162: Viewfinder, 163: Liquid crystal monitor, 164: SD card, 165: Card slot, 166: HDMI™ interface, 170: Operation unit, 172: Image processing circuit, 201: Internal battery, 202: External battery, 210: USB control circuit, 211: USB terminal, 211a: VBUS, 211b: CC terminal, 212: PD controller, 230: Charge control circuit, 231: Charge IC, 232:Charge microcomputer, 250: BG connection unit, 300/300a/300b: Power source switching circuit, 302: Switch, 303/304: AND switch, 500: Screen, 502: Selection bar, 510: Icon display area, 510a: Icon, 520: Screen scrolling button display area, 530: Menu display area, 531: Battery use order setting bar

PRIOR ART

Patent Document

Patent Document 1: JP2001-313858
Patent Document 2: JP2003-085954

The invention claimed is:
1. An imaging device to which an extension device for accommodating an external battery can be detachably attached, the imaging device comprising:

a main body configured to accommodate an internal battery;

a charging unit configured to charge the internal battery or the external battery with power input from outside;

an operation unit configured to receive an input for setting both a priority order for charging the internal battery and the external battery and a use order of the internal battery and the external battery in a single operation; and a controller configured to control the charging unit to charge the internal battery or the external battery according to the set priority order and use order.

2. The imaging device according to claim 1, comprising a display unit configured to display an operation interface for receiving the input for setting the priority order.

3. The imaging device according to claim 2, wherein the display unit is configured to display either a first screen or a second screen by switching the first screen and the second screen, or display the first screen and the second screen simultaneously, the first screen showing a battery remaining level for the internal battery and the external battery, the second screen being a screen for receiving the input for setting the priority order.

4. The imaging device according to claim 1, wherein the controller is configured to:

monitor a remaining battery level for one of the internal battery and the external battery that is being charged based on the priority order; and control the charging unit to switch charging from the one of the internal battery and the external battery to another one of the internal battery and the external battery, upon detecting that the one of the internal battery and the external battery has reached a full charge or a predetermined remaining battery level less than the full charge.

\* \* \* \* \*